United States Patent
Kramer

(10) Patent No.: US 8,566,130 B2
(45) Date of Patent: Oct. 22, 2013

(54) SYSTEM AND METHOD FOR ELECTRONIC AUDITING

(75) Inventor: Kevin John Kramer, Stilwell, KS (US)

(73) Assignee: Overland Solutions, Inc., Overland Park, KS (US)

( * ) Notice: Subject to any disclaimer, the term of this patent is extended or adjusted under 35 U.S.C. 154(b) by 0 days.

(21) Appl. No.: 13/358,302

(22) Filed: Jan. 25, 2012

(65) Prior Publication Data

US 2012/0191483 A1 Jul. 26, 2012

Related U.S. Application Data

(60) Provisional application No. 61/436,054, filed on Jan. 25, 2011.

(51) Int. Cl.
*Q06Q 40/00* (2012.01)
*Q06Q 10/00* (2006.01)

(52) U.S. Cl.
USPC .............................................. 705/4; 705/10

(58) Field of Classification Search
USPC ....................................................... 705/4, 10
See application file for complete search history.

(56) References Cited

U.S. PATENT DOCUMENTS

| | | | | |
|---|---|---|---|---|
| 5,855,005 A | * | 12/1998 | Schuler et al. | 705/4 |
| 6,336,096 B1 | * | 1/2002 | Jernberg | 705/4 |
| 2003/0115092 A1 | * | 6/2003 | Barnett et al. | 705/10 |

OTHER PUBLICATIONS

Boyer, M. Martin; Gobert, Karine; "Dynamic prevention in short-term insurance contracts"; Journal of Risk and Insurance; Jun. 2008; ISSN: 0022-4367.*
Wong, W.Y. "Improve PRV audits. (pressure relief valve systems)"; Hydrocarbon Processing; Nov. 1998; ISSN: 0018-8190.*
Gendron, Yves; Bedard, Jean; Gosselin, Maurice; "Getting inside the black box: a field study of practices in "effective" audit committees"; Auditing: A journal of Practice & Theory, Mar. 2004; ISSN: 0278-0380.*

* cited by examiner

*Primary Examiner* — Edward Chang
(74) *Attorney, Agent, or Firm* — Lathrop & Gage LLP

(57) ABSTRACT

A system for performing insurance policy audits electronically. The system optimizes service selection by tailoring an audit to an insured's business category and state(s) in which the insured does business. Initially, the insured is sent a letter and password to enter the system website. Once online, the insured is prompted to answer questions to complete the audit in a self-driven manner. Insureds can save work in progress and return to the audit later. The interactive process drives the methodology for insureds to complete the audit online, resulting in a more accurate audit at a lower average cost.

14 Claims, 3 Drawing Sheets

SYSTEM AND METHOD FOR ELECTRONIC AUDITING

RELATED APPLICATIONS

This application claim priority to U.S. Provisional Patent Application Ser. No. 61/436,054, filed Jan. 25, 2011, the disclosure of which is incorporated herein by reference.

BACKGROUND

In an insurance policy audit, certain records of the insured are 'audited' to verify that they match what appears on the insured's insurance application, and what the insurance carrier believes the insured's risk to be. Previous insurance policy audits have presented insureds with a predetermined list of questions regardless of the insured's type of business. These questions are determined-in-advance and thus do not allow tailoring an audit to an insured's specific type of business. A method is therefore desired that will increase the accuracy of the determination of the insured's exposure base.

SOLUTION/SUMMARY

The present system comprises a web-driven system designed to perform insurance policy audits electronically. The system optimizes service selection by tailoring an audit to an insured's business category and state(s) in which the insured does business.

Initially, the insured is sent a letter and password to enter the system website. Once online, the insured is prompted to answer questions to complete the audit in a self-driven manner. Insureds can save work in progress and return to the audit later. The interactive process drives the methodology for insureds to complete the audit online, resulting in a more accurate audit at a lower average cost.

DETAILED DESCRIPTION

Figure 1:
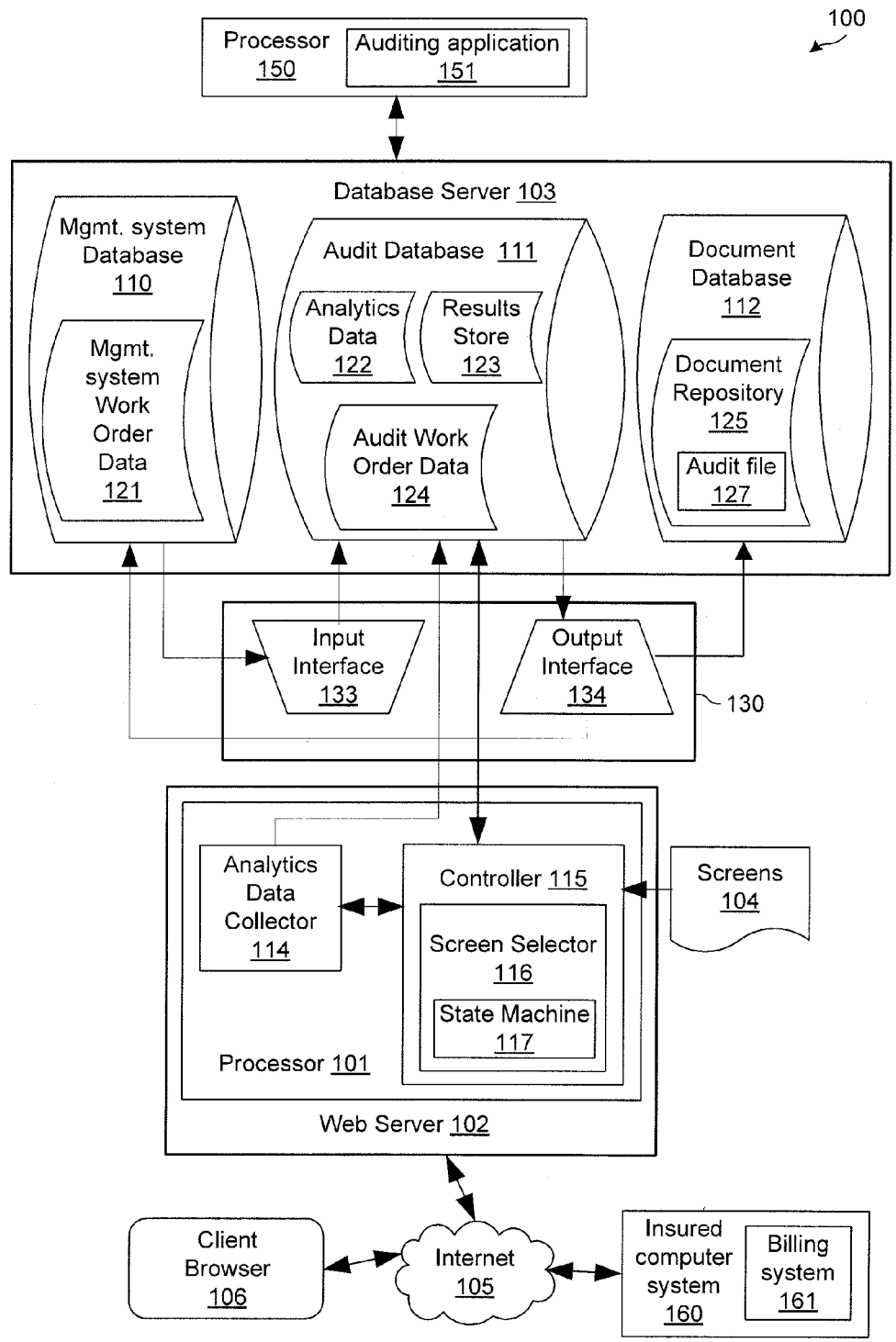
FIG. 1 is a diagram showing exemplary components of one embodiment of the present system.

FIG. 1 is a diagram showing exemplary high-level components of the present auditing system 100. As shown in FIG. 1, in an exemplary embodiment, the present system comprises a processor 101 coupled between a web server 102 and a database server 103. Web server 102 communicates with a client (user) browser 106 via the Internet 105. Database server 103 is coupled to an insurer database 110, an audit database 111, and a document database 112. I/O interface 130 includes input interface 133 and output interface 134, which provide communication between databases 110, 111, and 112.

The input interface 133 responds to requests from controller 115 to get data from management system database 110. Controller 115 runs on processor 101 and is aware of the API and/or database queries required to communicate with database server 103. Controller 115 coordinates actions between the client browser 106 and other system modules. In particular, there are three data flows managed by the controller:

1. Initial launch: Initially, a user launches the browser and navigates to a URL which provides a connection to web server 102. Controller 115 then requests a unique user ID (previously sent to the user), gathers known user data from the insurer database 110 via input Interface 133, queries the results store 123 for partially completed audit results, and requests the appropriate starting audit screen from screen selector 116.
2. Audit progress: As the user proceeds through the audit process, controller 115 takes the latest user input, analyzes it for correctness, sends it to results store 123, requests the next screen from the screen controller, and sends the screen to the client browser 106.
3. Audit completion: Once the user has completed entering data into all of the screens, controller 115 sends the results to document database 112 by piping the data in results store 123 through output interface 134.

The present audit system is dynamic, in that the flow of questions is determined by user (insured) responses as the user proceeds through the audit. A screen selector 116, which, in one embodiment is an application controlled by controller 115, provides the appropriate next (or previous) screen for the controller to send to the client browser 106. Screens 104 are the 'pages' of the audit flow which are displayed via client browser 106. These screens are forms which can be implemented and modified by a front-end developer.

Screen selector 116 incorporates a simple state machine 117 which takes the current state including the current screen and other variables such as 'business type'—and maps the current state to a next state, in which the next screen to display on client browser 106 is indicated. State machine 117 determines each successive state based on the previous state and one or more answers to questions supplied by the insured. The screen selector also provides a previous state if, for example, the user needs to go back to an earlier screen in the flow. This functionality may be implemented, for example, as a script with logic, a database lookup table, or a combination of both.

Database 110 is used for managing all audit process assignments to be performed, hereinafter termed "work orders". Each work order contains specific information on the insurance policy being audited, such as the policy number, policy period, class codes, policyholder info, etc. This data is used to complete the work orders. Once a work order is received in database area 121, a subset of the work order information that is necessary for the insured (who is also a "user" of the present system) to complete the corresponding audit is sent to a work order data store 124 in database 111. Document repository area 125 in document database 112 stores completed audit documents and any attachments that are submitted by the insured to support the audit information provided.

When the audit is complete, controller 115 sends the results from results store 123 to document repository 125 via output Interface 134. The output interface understands the database queries and/or APIs (application programming interfaces) for storing the audit results into the document repository 125.

In one embodiment, in order to get feedback on the design and usability of the online audit, an analytics data collector application (or script) 114 is used to track user activity throughout the audit process. Online user behavior is monitored in an effort to refine the procedural flow. In one embodiment, client-side scripts running on the client browser send event notifications to the server. These event notifications are sent as packets which may include the user ID, the current screen ID, an event code, a question ID, a timestamp, and other parameters. Event types may include navigation between screens, navigation between fields, and exiting the audit process. The analytics data collector script 114 on web server 102 receives these events and records them in the analytics database 122.

Figure 2:
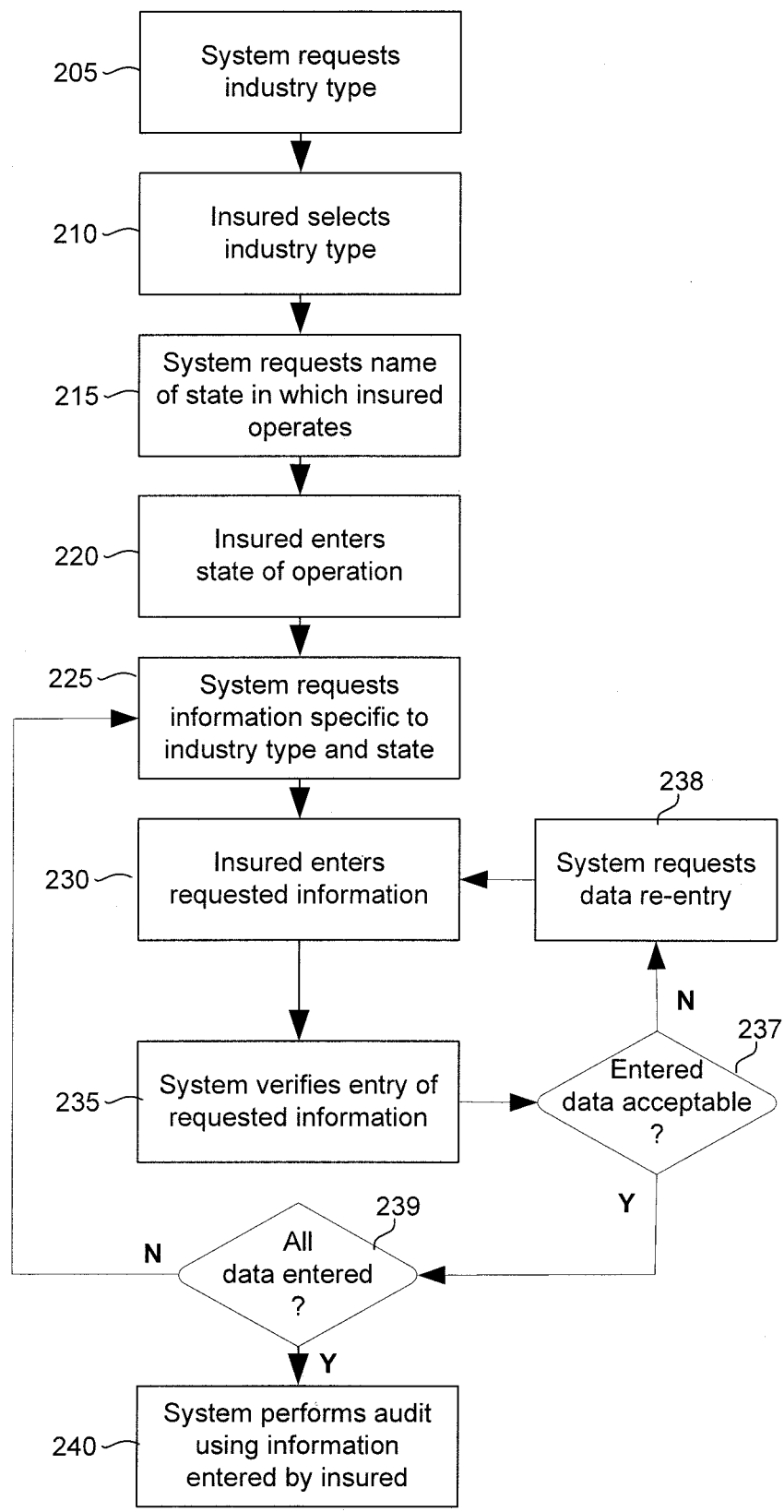
FIG. 2 is a flowchart showing exemplary steps performed by the present system in one embodiment.

FIG. 2 is a flowchart showing exemplary steps performed by the present system in an exemplary embodiment. The steps shown in FIG. 2 represent actions taking place, via the Internet 105 and web server 102, between a controller/screen selector application 115 and an insured to be audited, running client browser 106. Controller/screen selector application 115 coordinates actions between the client browser 106 and other system modules. The steps shown in FIG. 2 are performed by system 100.

At step 205, the system requests an insured's industry type. At step 210, the insured selects the industry type from a list of types of industries, such as non-profit organization, hospitality industry, transportation industry, etc. The industry type determines which subsequent questions the insured is asked, and the insured response drives further subsequent questions to be asked related to that specific industry for workers compensation or general liability purposes. The industry type also drives various exposure base adjustments that are particular to the selected industry type. For example, certain questions, such as those pertaining to the insured's product, can drive subsequent questions related to installation, service, and repair, etc.

At step 215, the system requests the name of each state in which the insured operates, and the insured responds by entering the state name(s), at step 220. The state selection drives subsequent actions, including additional questions, related to various exposure base adjustments that may be applicable for each individual state selected by the insured. The state selection, industry type selected, plus the insured's answers to questions presented during the present audit, determines the exposure base adjustment entries that populate an exposure spreadsheet.

At step 225, the system begins an iterative process of requesting and receiving information from the insured. The requested information is entered by the insured at step 230, and the system verifies that the data entered by the insured is responsive to the corresponding questions at step 235. If, at step 237, the data entered by the insured is not acceptable (e.g., if the requested information has not been completely supplied), then, at step 238, the system requests re-entry (or complete entry) of the data requested in step 225.

If (at step 237) the data entered by the insured is acceptable, then, at step 239, a check is made to determine whether all requests for information have been made by the system and answered by the insured, and steps 225, 230, 235, and 237-239 are repeated as necessary. Finally, at step 240, the system performs the insurance policy audit using the information entered by the insured.

Figure 3:
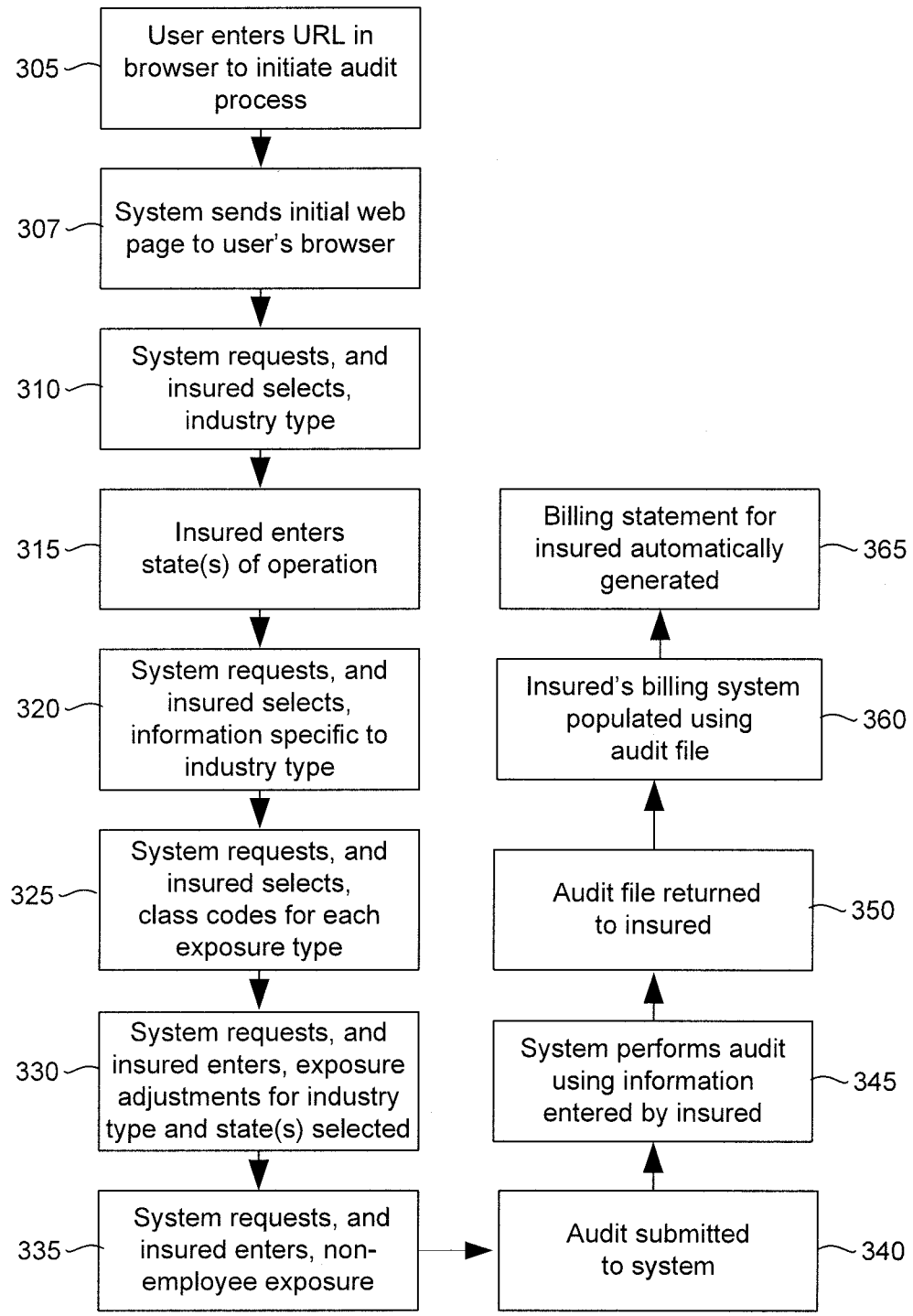
FIG. 3 is a flowchart showing, in greater detail, exemplary steps performed by the present system in one embodiment.

FIG. 3 is a flowchart showing, in greater detail, exemplary steps performed by the present system in one embodiment. As shown in FIG. 3, at step 305, the user enters a URL, using browser 106 to request initiation of the audit process. Web server 102 receives the request and sends the request to controller 115, which uses screen selector application 116 to select an initial web page to be sent to the user's system. At step 307, the selected web page (hereinafter "screen") is then sent to the user's browser 106, and the user enters a secure access code to initiate the audit process.

At step 310, the next screen is sent to browser 106 and the insured selects their industry type from one of multiple industry 'tracks'. The industry track selection determines the appropriate questions to ask for that particular industry, which will drive subsequent data entry screens. At step 315, the next screen is sent to browser 106, and the user selects the state or states in which the insured's business operates. The state selection determines the exposure base adjustment entries that populate columns in an exposure spreadsheet according to a chart of state exceptions.

Some general questions are then asked, and then in step 320, industry specific questions are sent to browser 106 that are determined based upon the industry selection above. The insured also provides a description of operations in a text box. The number of employees the insured has will drive the setup of the exposure worksheet. In response to subsequent screens sent to browser 106 the insured then enters officer/principal information.

At step 325, the insured is provided with a selection of class codes to enter, based on policy information. The insured selects the appropriate class code that matches each exposure type that was entered. At step 330, in response to questions on one or more additional screens, the insured enters all necessary exposure adjustments for the industry type and state(s) selected. At step 335, the system requests, and the insured then enters, non-employee exposure, if any.

A summary screen is then sent to the user, who then verifies the information that was entered. The user must check a box to confirm that all data entered was accurate to the best of their knowledge, and then submits the audit to system 100, at step 340. At step 345, once the audit is submitted, all data entered by the insured is transferred to an auditing application 151 executing on processor 150. A mapping application under control of the auditing application 151 extracts the information from fields in the various screens submitted by the user, and then automatically transfers the information into the appropriate field within the auditing application. A completed audit file 127 is then generated, without any human intervention, by auditing application 151 using information entered by the insured, and the audit file is stored in document repository 125.

At step 350, the audit file 127 is then returned to the insurer via a system-to-system feed into an insurer's computer system 160 (using an Internet connection, for example). In one embodiment, at step 360, information in the audit file is directly populated into the insurer's policy billing system 161, via either the system-to-system feed or by insurer's computer system 160. A billing statement for the insurer is automatically generated, for example, by the insurer's billing system 161, using the information from the audit file, at step 365.

Having described the present system and method in detail and by reference to specific embodiments thereof, it will be apparent that modifications to the system and method, and variations thereon, are possible without departing from the scope of the invention defined in the appended claims. It is therefore contemplated that the present system is not limited to the specifically-disclosed aspects thereof.

What is claimed is:

1. A computer-implemented method for auditing an insurance policy for an insured comprising:
    (a) requesting, from the insured, the insured's industry type;
    (b) receiving the insured's industry type;
    (c) requesting, from the insured, answers to additional questions, wherein a plurality of the additional questions are based on the insured's industry type, and wherein a state machine executing on the computer determines the additional questions;
    (d) receiving the answers to a plurality of the questions;
    (e) repeating steps (c) and (d) until the answers have been received;
    performing an audit on the insured's business via a computer, using a plurality of the answers to the questions provided by the insured, to generate an audit file;

requesting the insured to select at least one state in which the insured operates; and determining exposure base adjustments applicable for each said state selected by the insured in response to the insured's selection of the at least one state.

2. The method of claim 1, wherein a plurality of the additional questions are determined by the answers to previous ones of the additional questions.

3. The method of claim 1, wherein information in the audit file is directly populated into an insurer's insurance policy billing system.

4. The method of claim 3, wherein a billing statement for the insured is automatically generated using at least some of the information generated by the audit.

5. The method of claim 1, including an analytics data collector application, executing on the computer, for receiving insured input and recording the input in an analytics database to track user activity during the course of the audit.

6. A computer-implemented method for auditing an insurance policy for an insured comprising:

requesting, from the insured, the insured's industry type;

requesting, from the insured, answers to additional questions based on the insured's industry type;

performing an audit on the insured's business via a computer, using the answers provided by the insured;

requesting the insured to select at least one state in which the insured operates; and determining further additional questions for the insured in response to the insured's selection of the at least one state, wherein answers to the further additional questions determine exposure base adjustments applicable for each said state selected by the insured.

7. The method of claim 6, wherein a state machine running on the computer determines a plurality of the additional questions using information in the answers to previous ones of the additional questions.

8. The method of claim 6, wherein information generated by the audit is populated into an insurer's insurance policy billing system.

9. The method of claim 8, wherein a billing statement for the insured is automatically generated from information in the audit.

10. The method of claim 6, including an analytics data collector application for receiving insured input and recording the input in an analytics database to track user activity.

11. A system for auditing an insurance policy for an insured comprising:

a web server communicatively coupled, via the Internet, with a browser;

a computer coupled to the web server and to a database;

a state machine, executing on the computer;

wherein the system requests, from the insured, via the browser, the insured's industry type and answers to additional questions;

wherein the state machine determines the additional questions based on answers to previous ones of the questions including the industry type;

wherein an audit is performed on the insured's business using the answers provided by the insured;

wherein the insured is requested to select at least one state in which the insured operates; and wherein each said state selected by the insured determines exposure base adjustments applicable to the audit.

12. The system of claim 11, wherein information in the audit is populated into an insurer's insurance policy billing system.

13. The system of claim 12, wherein a billing statement for the insured is automatically generated by the insurer's system, using information generated by the audit.

14. The system of claim 11, including an analytics data collector application for receiving insured input and recording the input in an analytics database to track user activity.

\* \* \* \* \*